Aug. 25, 1959   P. P. DEAN   2,901,076
OVERLOAD PROTECTION FOR POWER DRIVES
Filed Feb. 8, 1955

INVENTOR
PETER PAYNE DEAN

BY *Lindsey and Prutzman*
ATTORNEYS

United States Patent Office

2,901,076
Patented Aug. 25, 1959

2,901,076

OVERLOAD PROTECTION FOR POWER DRIVES

Peter Payne Dean, Westbrook, Conn.

Application February 8, 1955, Serial No. 486,936

2 Claims. (Cl. 192—150)

This invention relates to improvements in automatic overload protection for electric power drives. The invention is particularly applicable to power drives for various devices that have definite limits of travel, such as gate valves, sluice gates, furnace doors, water-tight doors and the like.

In the operation of such devices as those mentioned, to avoid damage it is essential that the power drive be shut off promptly when the limit of travel is reached. Particularly when the moving parts are heavy and considerable momentum is involved, or where the mechanism is installed in a relatively inaccessible location such as underground, such damage can be extremely costly and difficult to repair. Although such devices generally have limit switches and the drive motors are generally equipped with overload switches, limit switches are subject to improper adjustment and of course provide no protection whatever in the event an obstruction is encountered intermediate the limits of travel, and overload switches are susceptible to inadvertent resetting before the condition causing the overload is corrected. Hence such protective devices do not provide as complete a guarantee as desired that the power drive will be shut off in the event of an overload and remain shut off until all possibility of damage is removed. One object of the present invention, therefore, is to provide an improved electric motor drive particularly suitable for such limited travel apparatus having an overload protective device which operates instantly responsive to overload and is effective, not only to shut off the drive motor electrically, but also to simultaneously disconnect the drive mechanically.

Another object is to provide in such a power drive an overload responsive protective device which is effective during operation of the drive in either direction.

Another object is to provide such a safety cut-off which, when once tripped, cannot be inadvertently reset until manually released.

Another object is to provide an improved power drive having a self-contained drive disconnecting means and power shut-off which is simple and inexpensive in construction and compact in size, and which requires no care or attention of any kind during normal operation of the drive mechanism.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
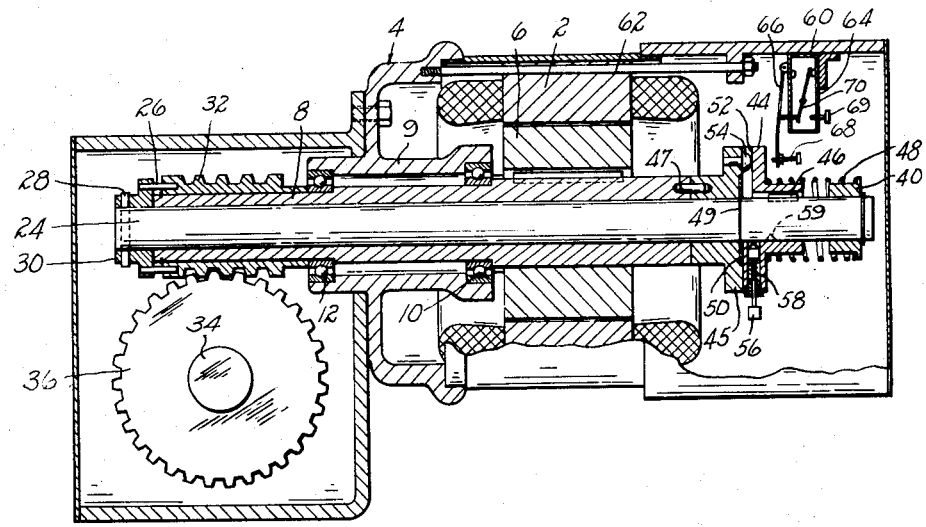
Figure 1 is a longitudinal sectional view of the motorized drive mechanism in accordance with the present invention.
Figure 2:
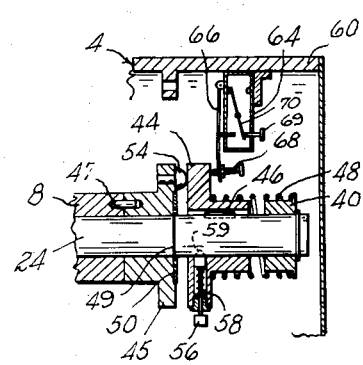
Figure 2 is a sectional view of a portion of the apparatus shown in Figure 1 showing the relation of the parts in the disconnected condition of the drive mechanism.

Referring to the drawing, a motorized drive mechanism constructed in accordance with the invention includes an electric motor having a stator 2 supported in a housing 4 and having a rotor 6 mounted on a hollow shaft 8. The shaft 8 extends through a tubular section 9 formed in one wall of the housing and is supported cantilever fashion therein in spaced ball bearings 10, 12, thus eliminating the need for an additional bearing and saving space at the other end of the rotor.

Journaled in the hollow shaft 8 is an inner shaft 24. At one end of the inner shaft is a driving member shown by way of example as a worm 32 connected to shaft 24 by pins 26, 28 and a collar 30, and rotatably mounted on the extension of the shaft 8. The worm 32 is drivingly engageable with the output shaft 34 of the apparatus through a worm wheel 36.

The opposite end of the inner shaft extends beyond the motor and carries a collar 40 and a flanged half-coupling 44. A key 46 connects the shaft and half-coupling 44 for rotation, yet permits free axial movement of the half-coupling on the shaft. Opposite half-coupling 44 is another flanged half-coupling 45 rotatable on shaft 24 and connected for rotation with shaft 8 by one or more pins 47. Half-coupling 45 is retained against axial movement by a locking ring 49, and is partially faced with a friction disc 50. A spring 48 retained by the collar 40 urges half-coupling 44 against half-coupling 45 and maintains their opposed faces in abutting relation.

Figure 3:
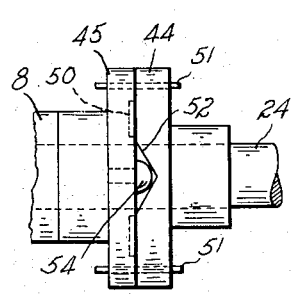
Figure 3 is an enlarged fragmentary view of a portion of the structure shown in Figure 1.
Figure 4:
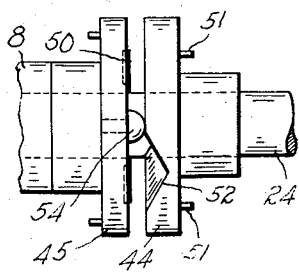
Figure 4 is a view similar to Figure 3 showing a relation of the parts in the disconnected condition of the drive.

The two half-couplings 44, 45 are connected for the transmission of torque by frangible members in the form of a plurality of shear pins 51 as best shown in Figure 3. The pins are designed to shear at a predetermined overload torque thereby instantly mechanically disconnecting the two half-couplings and permitting relative rotation between them. In the face of half-coupling 44 is a V-section radial groove 52 which accommodates a projection 54 in the form of the rounded head of a pin carried by half-coupling 45. The clearance between the side of the groove 52 and projection 54 is such as to permit limited angular movement between the half-couplings 44, 45 sufficient to shear the pins 51 without incurring engagement between the detent and the sides of the groove. When the pins shear, however, half-coupling 44 stops turning, and the relative rotation of half-coupling 45 engages projection 54 with the side of groove 52 and displaces half-coupling 44 axially toward collar 40. Half-coupling 44 carries a latch 56 in the form of a radial pin biased inwardly against the shaft 24 by a spring 58. When half-coupling 44 is axially displaced, the latch engages a notch 59 in shaft 24 and locks the half-coupling 44 in displaced position, preventing it from chattering against projection 54. If desired, shear pins 51 can be omitted and the half-couplings 44, 45 drivingly connected by any suitable clutch arranged to cam half-coupling 44 axially responsive to overload.

The half-couplings are enclosed by a protective cover 60 which also serves to enclose the right-hand end of the motor and is secured to the housing 4 by bolts 62. Mounted on the cover is an electrical switch 64 which controls power supply to the motor and may also control a visual or audible alarm signal. The switch is normally closed as shown in Figure 1 and has an actuating arm 66 normally axially spaced from the flange of half-coupling 44. A screw 68 permits convenient adjustment of the normal spacing between the actuator 66 and the half-coupling flange. If desired, switch 64 may be of the "latch open" type causing the circuit to remain open even if the spring plunger 56 fails to lock into the hole 59. With such a switch a spring plunger 69 is used to reset the switch arm 70 to "run" position.

In operation of the device driving power is supplied from the motor to output shaft 34 through hollow shaft 8, half-coupling 45, shear pins 51, half-coupling 44, inner shaft 24, worm 32 and worm wheel 36. When the motor is started, engagement of friction disc 50 with the opposed face of half-coupling 44 assists in transmitting torque between the half-couplings and reduces the load on shear pins 51. When the motor is overloaded, as when the driven apparatus encounters an obstruction or passes its limit of travel, the pins 51 shear, and this instantly and completely severs the mechanical driving connection between half-coupling 45 and half-coupling 44. Thus rotation of shaft 24 immediately stops and no further movement of output shaft 34 will take place. Half-coupling 45 continues to be driven by shaft 8, however, and thereby engages projection 54 with the side of groove 52 and cams half-coupling 44 axially toward collar 40. This engages half-coupling 44 with switch actuator 66 and automatically shuts off electrical power to the motor, as well as engaging latch 56 with notch 59 so as to prevent resetting of the switch until the latch is manually released.

Thus it may be seen that a power drive constructed in accordance with the present invention is immediately disconnected both mechanically and electrically in response to overload, thereby instantly stopping the rotation of output shaft 34 and precluding damage due to overtravel or the application of excessive force to whatever equipment is driven thereby. Since the pins 51 will shear and projection 54 will cam half-coupling 44 outwardly regardless of the direction in which the shafts 8, 24 are turning, it will be apparent that the safety cut-off is effective regardless of the direction in which output shaft 34 is being driven. The engagement of the latch 56 with the notch 59 insures that the half-coupling 44 will remain in its axially displaced position and prevent interference of any kind between the half-couplings. Since the switch 64 is automatically latched in open position, inadvertent running of the motor is prevented until the apparatus is actually manually reset, thereby safeguarding the drive against premature resetting before the overload condition is fully corrected. The switch may, of course, be conveniently wired to actuate any desired signalling device as well as disconnect the motor, and thus may conveniently provide an immediate local or remote indication of the disconnected condition of the drive. The single bearing or cantilever mounting of the shaft 8 saves space at the right-hand end of the rotor, thereby increasing the compactness of the apparatus while simplifying its construction and reducing its cost.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In an electric motor, a rotor, a hollow drive shaft mounted coaxially within the rotor and journaled intermediate its ends, an inner shaft journaled within the drive shaft having a driving member on one end and having the other end thereof projecting from the drive shaft, a first coupling member mounted on the projecting end of the inner shaft for rotation with and axial movement relative to said inner shaft, a second coupling member adjacent the first coupling member fixed on the corresponding end of said drive shaft for rotation therewith, said coupling members having normally abutting surfaces facing in opposite directions axially of the shafts, shearable torque transmitting pins extending in an axial direction and drivingly connecting said coupling members, cooperating cam surfaces on said coupling members for displacing said first coupling member axially of said driven shaft in response to relative rotation of said coupling members, a spring between the inner shaft and the first coupling member urging said first coupling member toward said second coupling member, and a switch mounted for actuation responsive to axial movement of the first coupling member.

2. In an electric motor, a rotor, a hollow drive shaft mounted coaxially within the rotor and journaled intermediate its ends, an inner shaft journaled within the drive shaft having a driving member on one end and having the other end thereof projecting from the drive shaft, a first coupling member mounted on the projecting end of the inner shaft for rotation with and axial movement relative to said inner shaft, a second coupling member adjacent the first coupling member fixed on said drive shaft for rotation therewith, said coupling members having abutting surfaces facing in opposite directions axially of the shafts, shearable torque transmitting pins drivingly connecting said coupling members, cooperating cam surfaces on said coupling members for displacing said first coupling member axially of said driven shaft in response to relative rotation of said coupling members, manually releasable latch means to latch said first coupling member in axially displaced position to preclude interference between said cam surfaces including a radially disposed plunger on said first coupling member and a plunger receiving notch on said driven shaft, a spring between the inner shaft and the first coupling member urging said first coupling member toward said second coupling member, and a switch mounted for actuation responsive to axial movement of the first coupling member.

References Cited in the file of this patent

UNITED STATES PATENTS

| | | |
|---|---|---|
| 1,412,444 | Baker | Apr. 11, 1922 |
| 1,678,634 | Chandler | July 31, 1928 |
| 2,037,260 | Nelson | Apr. 14, 1936 |
| 2,497,893 | Linahan | Feb. 21, 1950 |
| 2,605,946 | Currivan | Aug. 5, 1952 |
| 2,628,337 | Getz | Feb. 10, 1953 |
| 2,646,519 | Kalikow et al. | July 21, 1953 |
| 2,763,797 | Dean | Sept. 18, 1956 |